FIG. 1

INVENTORS.
LEONARD ACONSKY
WALTER J. RIKER
BY Theodore M. Jablon
ATTORNEY.

July 26, 1966

L. ACONSKY ETAL 3,262,575

ROTARY DRUM FILTERS

Filed Aug 8, 1963

INVENTORS.
LEONARD ACONSKY
WALTER J. RIKER
BY Theodore M. Jablon
ATTORNEY.

July 26, 1966  L. ACONSKY ETAL  3,262,575
ROTARY DRUM FILTERS

Filed Aug. 8, 1963  7 Sheets-Sheet 6

INVENTORS
LEONARD ACONSKY
WALTER J. RIKER
BY Theodore M. Jablon
ATTORNEY.

United States Patent Office 3,262,575
Patented July 26, 1966

3,262,575
ROTARY DRUM FILTERS
Leonard Aconsky, New York, N.Y., and Walter J. Riker, Westport, Conn., assignors to Dorr-Oliver Incorporated, Stamford, Conn., a corporation of Delaware
Filed Aug. 8, 1963, Ser. No. 301,939
4 Claims. (Cl. 210—395)

This application is a continuation-in-part of our copending Ser. No. 124,281, filed June 29, 1961, now abandoned.

This invention relates to improvements in continuous rotary drum filters and more particularly to the external type where a horizontal drum rotates relative to a body of slurry to be filtered, and internal filtrate piping is provided in the drum.

It is among the objects of this invention to improve the filtration efficiency of the filter unit preferably vacuum operated, and furthermore to simplify and to reduce the cost of its construction.

Such a filter usually has a cylindrical drum body or cylindrical shell rotatable on trunnions with a trunnion valve controlling the filter operating cycle. Longitudinal filter compartments or filter panels arranged side by side about the periphery of the drum, extending longitudinally from end to end of the drum, and an internal pipe arrangement communicates with the trunnion valve for the withdrawal of the filtrate liquid from these compartments on the drum.

As the filter drum rotates for instance with the lower portion of its periphery immersed in a bath of pulp in a vat, the filter compartments become successively submerged in the pulp or slurry to be filtered whereby a primary or strong filtrate solution is drawn from each of the compartments through the filtrate piping and through the trunnion valve, incident to the formation of the cake on the filter media covering the compartments.

The trunnion valve also controls subsequent phases of the filter operating cycle, following the emergence of the filter cake from the pulp. Thus, with vacuum suction through the trunnion valve continuing, the cake on the ascending side of the drum passes through a suction phase removing residual strong solution from the filter cake. Then follows the spray washing phase at the top of the drum, with the suction removing the resulting weak solution preferably into a separate receiver. On the descending side of the drum the suction further acts to remove residual weak solution.

Thereupon vacuum suction is discontinued by the trunnion valve to permit cake discharge just prior to the resubmergence of the respective compartments into the pulp and resumption of the vacuum suction when thus submerged in the cake formation zone of the next following filtration cycle.

Upon discontinuance of the vacuum suction in the cake discharge zone, air blow-back is preferably applied by the trunnion valve through the aforementioned internal filter piping for loosening the cake, thus to facilitate and expedite the cake discharge operation.

In the foregoing filter operating cycle, even though vacuum be maintained in each filter compartment during all but the relatively short cake discharge phase, a quantity of residual spent wash water or secondary dilute filtrate solution remains in the internal pipe system at the end of the vacuum phase of the cycle. Such residual liquid has undesirable effects in that it may gravitate or be forced back into the compartments and into the cake just prior to or during cake discharge assisted by the blow-back air. Especially with shallow immersion of the drum in the pulp, that is with low position of the zone of cake discharge, residual liquid may find its way back into the filter compartments, thus remoistening the cake.

At any rate remoistening the filter cake is objectionable where cake of special dryness is required, and where additional moisture would increase the cost of any subsequent drying operation.

Hence, it is among the objects of this invention to improve the filtration capacity and efficiency of such a filter unit by eliminating the aforementioned remoistening of the cake.

Another object is to provide an internal filtrate pipe arrangement of improved hydraulic efficiency.

Still another object is to provide a filtrate pipe arrangement within the filter drum, which is of great simplicity and which is not only hydraulically efficient but also of great structural simplicity and of low-cost construction.

In view of the foregoing objects, the invention provides a filtrate pipe arrangement embodying simple and effective means for intercepting and temporarily storing residual liquid in the filtrate pipes against the tendency to gravitate or to be forced back into the filter compartments and into the filter cake especially during the blow-back phase of the operating cycle. According to the invention, the residual liquid is blown into, and intercepted by an externally closed or dead end trap or pocket provided at the terminal end of the radially extending terminal portion of the trunnion pipe, and held therein during the cake formation phase. Subsequently, this trapped liquid having been held over through the cake formation phase, is allowed to drain back from the trap towards the trunnion valve when the trap reaches a more or less inverted position following the emergence of the cake.

With respect to improving the vacuum efficiency of the filter unit, the invention differs from the conventional filtrate pipe arrangement wherein a horizontal header has a plurality of lateral branch pipe connections extending at right angles therefrom to the drum, and leading to the respective drainage points of the associated filter panel. This header in turn is connected to a trunnion pipe leading to the trunnion valve, with flow volume and flow velocities in the header thus increasing stepwise in the direction of the trunnion pipe, and with the attendant loss in utilizable vacuum suction energy. According to a new concept, the improved filtrate pipe system of this invention eliminates the conventional header pipe by the provision of branch pipes leading in parallel relationship with one another from a radial section of the trunnion pipe directly to the respective drainage points of the filter panel. This novel design provides for substantially uniform flow velocities in the system, resulting in improved hydraulic characteristics providing better utilization of the vacuum suction energy, yet with a minimum of different pipe sizes required in this system.

In a preferred embodiment, the branch pipes extend substantially in both directions from the trunnion pipe, so that the filtrate pipe system has the appearance of a candelabra structure. Moreover, with large radii bends provided in the parallel branch connections, the energy consuming effect of abrupt changes in flow direction is thereby eliminated.

Other features relate to a novel and efficient pipe arrangement in the filter drum, featuring a novel pipe subassembly.

Other features and advantages will hereinafter appear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

Figure 1:
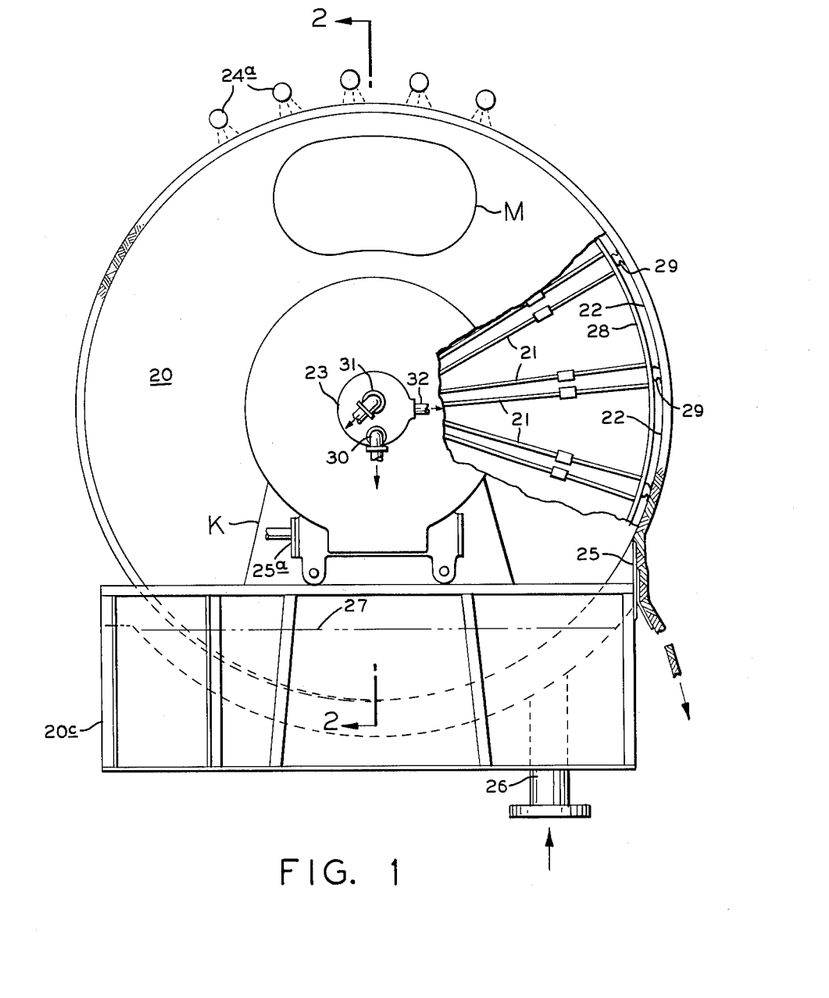
FIG. 1 is a semi-diagrammatic part-sectional view of the external drum filter, exposing some of the internal filtrate piping arrangement of the invention.
Figure 2:
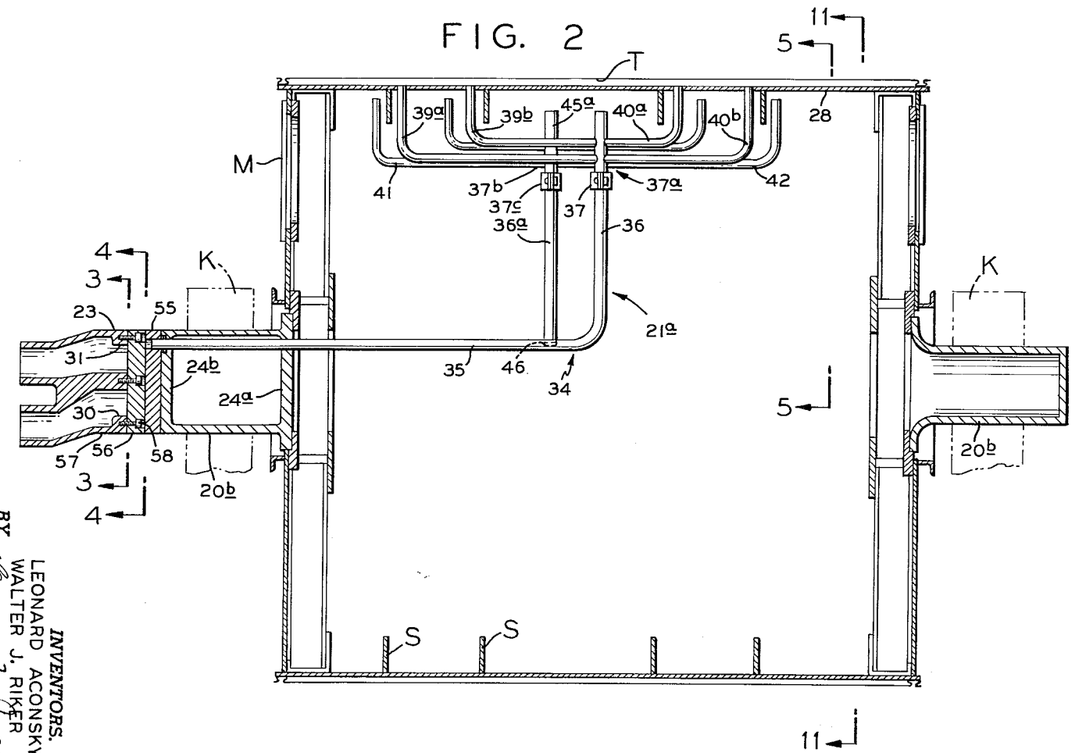
FIG. 2 is an enlarged sectional view taken on line 2—2 of FIG. 1, showing a side view of the internal filtrate piping for one filter compartment, including the filtrate interceptor means and other features of the invention.

In the accompanying drawings FIGS. 1 and 2 present a simplified and somewhat diagrammatic end view of an example of a continuous rotary vacuum drum filter unit embodying the invention, comprising a trunnion-supported filter drum 20 having internal annular stiffening ribs S and suitably disposed manholes M, rotatably supported by means of bearings K upon a vat. In FIG. 1 the end wall of the drum is shown partially broken away to expose and indicate the disposition of an internal filtrate pipe system 21 connecting respective filtrate compartments or panels 22 of the drum with a trunnion end of the drum. The filtrate compartments 22 are arranged externally of the drum, their operation in the filtration cycle being controlled by the conventional trunnion valve 23 furthermore to be described.

The filter unit is equipped with the usual filter appurtenances such as the wash liquid distributor means indicated by arrangement of spray pipes 24a, the doctor blade 25 for effecting cake removal, and drive means such as indicated by a conventional worm drive 25a for effecting the rotation of the filter drum relative to the filter valve 23 establishing the filtration operating cycle.

More particularly, the drum filter unit comprises a cylindrical drum body or shell 28 supported by its trunnions 20b on filter vat 20c. The filter drum is rotated partially immersed in a bath of pulp or slurry entering the filter vat through a feed connection 26, the pulp being maintained at a predetermined level 27 as by conventional means for example overflow.

Arranged about the periphery of the drum body or shell are longitudinally extending division strips 29 defining between them the aforementioned filtrate compartments 22 which may have conventional filter media mounted on supporting grids or the like here not specifically shown. Each of the filter compartments has its own filtrate pipe arrangement 21 for conducting filtrate that has entered the respective compartments through the filter media under the effect of vacuum, to the compartmented trunnion valve 23 cooperatively associated with one of the trunnions of the drum. This valve is provided with outlets 30 and 31 for the strong and weak filtrate solution respectively, connected respectively to suitable separate vacuum receiver means here not shown. This valve is also provided with an inlet 32 to the blow compartment therein whereby reverse pressure or air blowback may be applied incident to the filter cake discharge operation furthermore to be described.

In FIG. 2 a complete filtrate pipe construction 21a serving one filter compartment is illustrated embodying features of the invention. Preferably, this is a modular or composite construction comprising an L-shaped trunnion pipe 34 one leg 35 of which extends horizontally, the other leg 36 extending radially with respect to the drum.

Figures 6, 6A, 7:
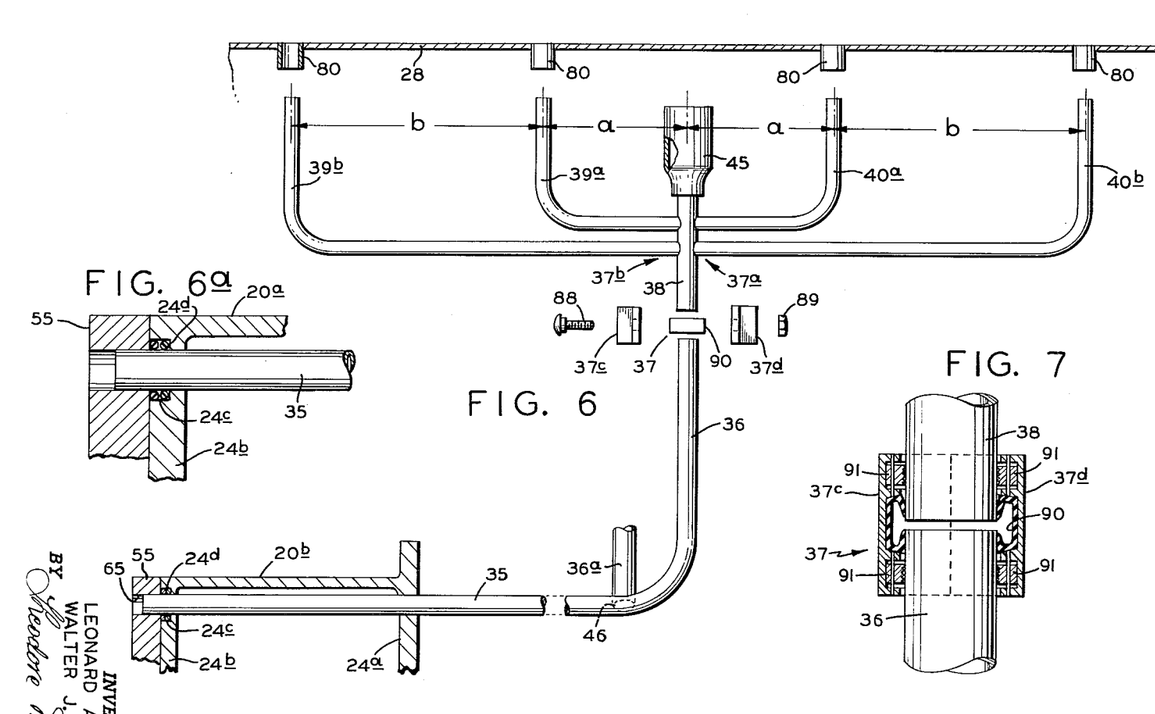
FIG. 6 is an enlarged detail side view of the improved filtrate piping for one filtrate compartment, exploded to illustrate a sub-assembly.
FIG. 6a shows a further detail in the mounting of the trunnion pipe.
FIG. 7 is an enlarged sectional view of pipe coupling means in the filtrate pipe system of the invention.

A coupling 37 which may be in the form of the clamping device shown in more detail in FIG. 7, provides air tight connection between the radial pipe leg 36 and a special prefabricated or pre-assembled candelabra-shaped branch pipe construction 37a embodying other features of the invention. In this example, the branch pipe construction comprises a radially extending main conduit 38 resembling the candelabra stem detachably connected to pipe leg 36 and thus presenting a radial extension thereof, with one set or plurality of branch pipes 39a and 39b extending laterally from central radial pipe 38 in one direction, and another set or plurality of branch pipes 40a and 40b extending laterally from pipe 38 in the opposite direction, which sets resemble the candelabra arms, preferably in substantially symmetrical arrangement as illustrated by dimensions "a" and "b." Bends of large radii are formed in the parallel branches minimizing hydraulic loss.

While the number of the branch pipes in each direction may be more or less, depending upon the requirements of the respective filter unit, an important advantage of having the branch pipes extend in parallel flow relationship from the main radial pipe 38 lies in the fact that this arrangement thereby provides substantially equal flow distribution with respect to the filtrate compartment 22 as well as rapid liquid withdrawal at minimum hydraulic loss, thus relatively increasing the total filtration efficiency of the unit.

The other ends of the branch pipes have terminal connections with the respective filtrate compartments, various modifications of which will be described in connection with detail FIGS. 8, 9, 10, designed to facilitate the mounting of the candelabra-shaped branch pipe construction and its connection to the respective filtration compartment on the drum.

The preferred arrangement wherein a plurality of branch pipes may extend in parallel flow relationship from the radial pipe in each direction presents the opportunity for the convenient and effective disposition of an interceptor means or liquid trap in the form of a dead end storage pocket 45 embodying further features of the invention.

Also to be noted is the fact that the trunnion pipe 34 has its outer end mounted air tight in the respective trunnion of the filter drum, providing a degree of limited yieldability in that connection. This in combination with the coupling means 37 greatly facilitates the installation of the filtrate piping in the drum as will be furthermore set forth.

The trap or pocket 45 carried by the outer end of conduit or center pipe 38 of the candelabra-shaped pipe construction, acts as a temporary reservoir for residual filtrate in the piping system, which may either be blown into or may gravitate into this reservoir during that phase of the drum rotation when blowback may be applied to assist cake discharge. In another mode of operation where blowback need not be applied in favor of providing merely a neutral phase to allow for cake discharge from the filter drum, any residual liquid that may then gravitate into the trap will thus be held over until it reaches a further advanced position in the operating cycle after cake emergence. This prevents cake remoistening on blowback, or runback during the neutral phase of cake discharge.

Trap 45 may be secured to conduit member 38 by any suitable air tight connection or it may be made an integral part of that member thus appearing as a dead end extension thereof. Preferably this trap is large enough to hold all the residual filtrate liquid remaining in the system during the critical phase of drum rotation mentioned above.

Figures 5, 8, 9, 10:
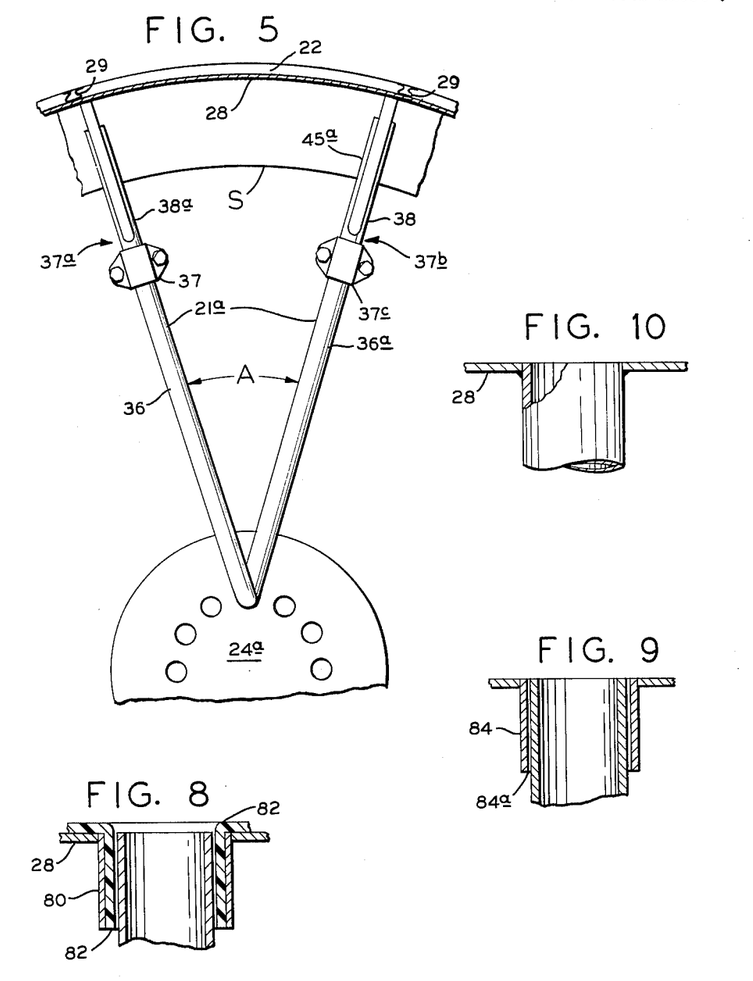
FIG. 5 is an enlarged sectional end view of the filtrate piping taken on line 5—5 of FIG. 2.
FIGS. 8, 9, 10 represent other details of pipe systems.

If desired, each filter compartment may be provided with a second candelabra-shaped branch pipe construction 37b similar to the one described above, coupled to a radial pipe 36a connecting with the trunnion pipe 34 at the bend for instance at point 46 thereof (see FIGS. 5 and 6), the radial leg 36a thus constituting with leg 36 of the trunnion pipe an enclosed angle "A" indicated in FIG. 5.

Accordingly, in this second or parallel branch pipe construction a pipe coupling is designated as 37c, a central pipe as 38a, the first set of branch pipes designated as 41, the second set of branch pipes designated as 42, and the trap designated as 45a.

The trunnion member 20b has inner and outer end plates 24a and 24b respectively through which pass the trunnion pipes 34. Air tight sealing relationship with respect to the outer end plate 24b and the pipe is provided by O-ring rubber sealing members 24c tucked into an annular recess 24d into which they are compressed by wear plate 55 which in turn is fixed to the end face of the trunnion 20b. The trunnion pipes 34 thus terminate in respective openings 65 of wear plate 55 which in turn has face to face operating contact with a stationary bridge plate 56 fastened to a stationary valve body 57 as by means of counter-sunk screws 58, the function of said bridge plate with respect to controlling the filtration cycle being furthermore explained below.

In the assembly of the trunnion valve 23, the stationary valve body 57 with bridge plate 56 are held against the wear plate 55 of the trunnion by spring pressure preferably with the aid of a known holding arrangement here not shown, lubrication being provided for the mutual contact faces of these cooperating parts.

Figure 3:
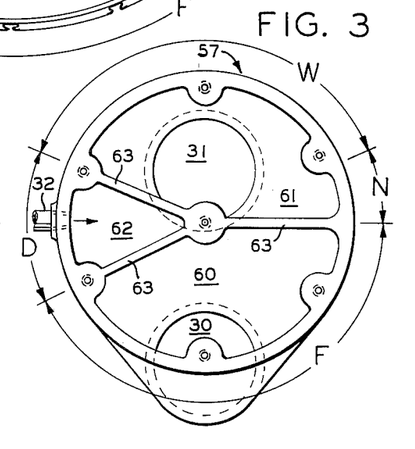
FIG. 3 is an enlarged sectional view taken on line 3—3 of FIG. 2, showing compartmentation of the trunnion valve for establishing the filter operating cycle.

More particularly (see FIGS. 3 and 4), the stationary valve body 57 of trunnion valve 23 has three sector-shaped compartments or valve chambers 60, 61 and 62 defined by three radial partitions or ribs 63. The valve chambers 60 and 61 communicate respectively with filtrate—or solution outlets 30 and 31 through which the filtration compartments are exposed to vacuum suction and through which filtrate liquid is drawn from the filter unit to vacuum receiver apparatus here not shown. Valve chamber 62 communicates with a source of super-atmospheric pressure by way of the aforementioned inlet 32 on the valve body, whereby at the appropriate time, namely incident to the cake discharge phase of the filtration cycle, each filter compartment is subjected to reverse pressure or air back-blow effect.

Since each of the valve chambers 60, 61 and 62 corresponds to a respective operating zone or phase of the filtration cycle (here shown counter-clockwise), it will be seen (see FIG. 11) that valve chamber 60 is co-extensive with a cake formation and primary filtration zone F, while valve chamber 61 is co-extensive with a spray wash and drying zone W, and the valve chamber 62 is co-extensive with a cake discharge zone D including the actual blow-back zone B interposed between neutral zones N-1 and N-2, the function of these zones further to be described below. A pulp level is indicated at P.

Figure 4:
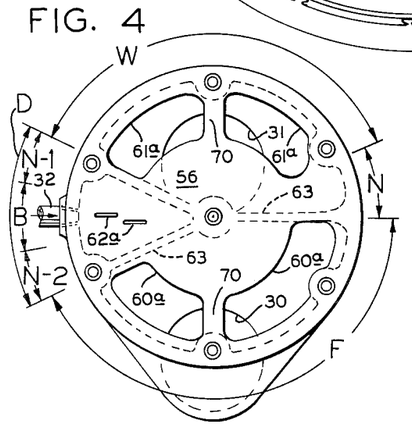
FIG. 4 is a similarly enlarged sectional view taken on line 4—4 of FIG. 2, showing a bridge plate embodied in the filter valve, for controlling the filter operating cycle.

Further particularized, the bridge plate 56 has arcuate apertures 60a corresponding to vacuum valve chamber 60, and apertures 61a corresponding to vacuum valve chamber 61 in the valve body, the intermediate radial ribs or webs 70 being provided to ensure rigidity and preventing warpage of that member, so that accurate planar pressure contact thereof with the wear plate 55 may be achieved. The bridge plate 56 is also provided with openings 62a corresponding to the air pressure chamber 62 in the valve body. Since the filter cake need only momentarily be subjected to reverse pressure or air blow-back effect, the slots 62a are made sufficiently small so that each successive opening 65 or trunnion pipe moving over these slots is subjected to back-blow for only a very short time. From the foregoing, it will be understood that it is the function of this bridge plate to determine the extent of the sequential operating zones or phases of the filtration cycle. Accordingly, if a change in timing of these zones or phases is desired, a correspondingly differently apertured bridge plate may be substituted.

As mentioned above, the trunnion pipes 34 terminate outwardly in wear plate 55, each pipe terminating in the aforementioned opening or hole 65 provided for it in that plate. Thus, the openings 65 and the associated trunnion pipes communicate consecutively through the respective apertures in the bridge plate with respective valve chambers 60, 61, and 62, in the course of a filtration operating cycle. For example, the operation of this cycle may be best understood by observing one filter compartment as it moves through the operating cycle in the direction of arrow R. Thus, it is seen that the associated opening 65 in the wear plate registering first with aperture 60a as the filtration phase commences, will allow vacuum to act throughout the filtration zone F (see FIG. 11) causing filtrate liquid to be drawn into the compartment while filter cake is formed on the filter medium. The filtrate or solution then passing through the associated piping and through apertures 60a into valve chamber 60 and out through solution outlet 30 to a suitable filtrate vacuum receiver here not shown.

Figure 11:
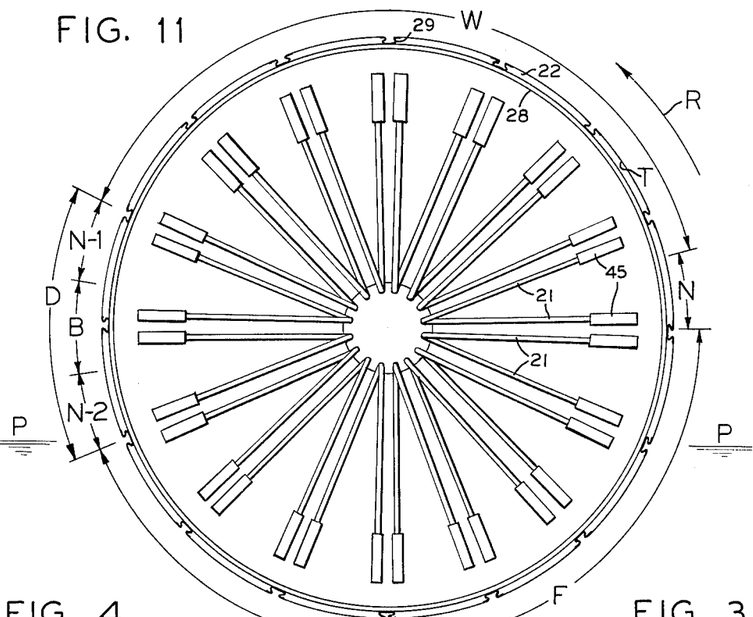
FIG. 11 is a cross-sectional diagrammatic view taken on line 11—11 of FIG. 2, embodying the pipe arrangement of FIG. 5 including the filtrate interceptor means.

The main filtration phase continues until the compartment emerges from the pulp bath in the vat at the end of the filtration zone. However, the compartment itself continues under vacuum so that as much as possible of the primary or strong filtrate solution is removed from the piping within the drum, substantially until the end of zone F is reached.

As the filter drum continues to rotate, the opening 65 in the wear plate, representing the respective filter compartment, moves over to area W of the bridge plate interposed between the apertures 60a and 61a, which area is made wide enough so that each opening 65 in trunnion pipe is blanked off momentarily during transistion between these apertures. This arrangement prevents any of the openings 65 from communicating at any time during the transition simultaneously with both the filtration zone F and the wash and drying zone W.

Then, with the filtrate compartment moving further into the wash and drying zone W, and the opening 65 and wear plate 55 registering with the stationary aperture 61a, vacuum effect is continued for collecting the spent wash liquid or weak solution preferably in a different receiver. In this operating zone of the cycle wash water is first applied to the filter cake as through the spray pipes 24a (see FIG. 1) for removing and recovering any residual filtrate solution of value that has remained in the filter cake, the resulting weak solution filtrate than passing through the associated pipes into valve chamber 61 and out through outlet valve duct 31 to a separate filtrate receiver here not shown.

Towards the latter part of this operating zone W, wash water is no longer applied to the filter cake, while vacuum is maintained causing removal of residual moisture resulting from the washing operation in the cake.

Then, as the filter drum continues to rotate, the opening 65 moves over the ports 62a which are interposed between neutral zones N-1 and N-2 (see FIG. 3) whereby the opening 65 is momentarily blanked off by the bridge plate 56, so that any short-circuiting of pressure air from valve chamber 62 into the adjoining valve chambers 60 and 61 is thereby prevented during the cake discharge zone with the back-blow loosening and aiding in the discharge of the filter cake by the doctor blade.

At this point of the filtration cycle any residual filtrate from the washing operation remaining in the filtrate pipes would be blown back into the filter cake, were it not for the dead end interceptor trap 45 or 45a. Thus, residual filtrate is blown into the trap or pocket and is retained there. The blow-back air separates into pipes (see FIG. 12) 82 and 83 free of residual filtrate liquid allowing for cake discharge without remoistening the cake. When the trap will have moved to a position above the horizontal center line of the filter drum and into the wash and drying zone W (see FIG. 11) the entrapped liquid is then harmlessly drained away together with the filtrate.

With respect to the assembly of the pipe system within the filter drum, the invention provides improvements and advantages, in view of the difficulties heretofore involved in the performance of that assembly. In one embodiment, each filtrate compartment 22 is provided with pipe sockets 80 (see FIG. 6) fixed to the edge of respective flow passage openings in the cylindrical shell of the drum, which pipe sockets extend radially inwardly from that shell. These pipe sockets are arranged and spaced so as to receive the outer ends of the branch pipes of the above described prefabricated or pre-assembled candelabra-shaped branch pipe construction.

Various embodiments of these pipe receiving sockets or connections are shown in FIGS. 8, 9, and 10. The type of socket or connection used depends upon several factors among which are the nature of the slurry, that is whether or not it is corrosive, the construction of the filter drum which may consist for example of bare steel, or of a solid plastic material, or it may be steel that has a rubber coating where it is in contact with the pulp liquid, or it may be otherwise prepared for contact with special slurries under special operating conditions.

Thus, the pipe connecting sockets shown in FIG. 8 illustrate one example where the filter drum consists of steel. In this instance, the inner face of sockets 81 is lined with a sealing material 82 such as rubber, effective to prevent leakage of filtrate from this joint or else to prevent air from leaking into the vacuum filtration system. Also, this lining and sealing material provides a tight fit for the branch pipes in the sockets.

In the embodiment of FIG. 9, the filter drum or shell may be constructed as of a plastic material preferably acid resistant, with the pipe sockets 84 consisting of the same material. The branch pipes then may be inserted without providing a special liner, and with only a suitable bonding material 84a employed to connect and sealingly join the parts with respect to one another.

In the example shown in FIG. 10, the branch pipes are soldered edgewise directly to the respective openings in the shell, permitting them to be removed by unsoldering the connection if so desired.

More particularly, referring to FIG. 6 for example, in the improved procedure of assembly of the piping system, the branch pipes of the prepared and prefabricated candelabra-shaped construction including the filtrate trap 45 (see FIG. 6) are inserted into respective pipe sockets 80 and the connection made in the manner above indicated. The leg 36 of the trunnion pipe 34 is then connected to the radial center pipe 38 for instance by means of a clamp type coupling 37, whereby air tight communication is established between the trunnion pipe and the branch pipes of the system. The trunnion pipe itself may be supported by the candelabra-shaped branch pipe construction, which in turn is held by those receiving sockets on the drum. With respect to the mounting of the trunnion pipe it is seen that the lightly yieldable connection provided by the coupling at the inner end cooperates with the yieldable O-ring seal at the outer end.

A coupling or clamp device suited for this connection is one (see FIGS. 6 and 7) having two halves 37c and 37d held together by bolts 88 and nuts 89, cooperating with a hollow inwardly open compressible sealing ring 90 surrounding the juncture between the respective ends of the respective pipes to be connected to one another, the sealing ring being surrounded and compressed by the clamps making a leakproof yet slightly yieldable connection.

Each of the half around clamp members is provided with a pair of threaded self-adjusting pipe gripping jaws 91 located respectively above and below the resiliently compressible sealing ring, as illustrated in FIG. 7. These jaws exert a firm hold upon the mutually adjacent ends of the respective pipes preventing any slipping away thereof from one another, while helping to support the trunnion pipe.

Figure 12:
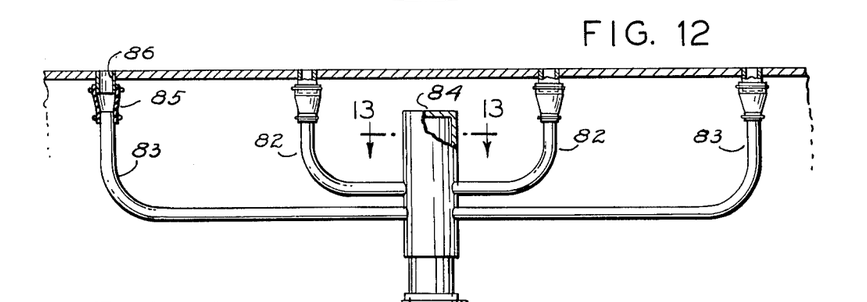
FIG. 12 is a side view of the filtrate piping modified.

The pipe sub-assembly as shown in FIG. 12 is generally similar to the candelabra-shaped structure shown in FIG. 5, with the exception that the branch pipes 82 and 83 leading from a dead end trap 84 have tubular flexible hose couplings 85 or the like connecting them with stub pipe portions 86 at the drainage points of the filter drum.

Figure 13:
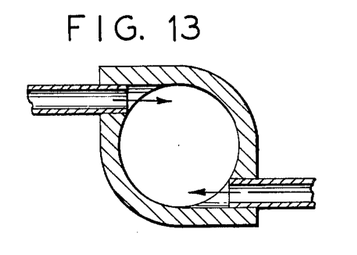
FIG. 13 is a cross section taken on line 13—13 of the terminal portion or trap of the trunnion pipe, showing a modification.

Another difference is visible in FIG. 13 showing the branch pipes 82 and 83 connected tangentially to the trunnion pipe or to the trap.

Figure 14:
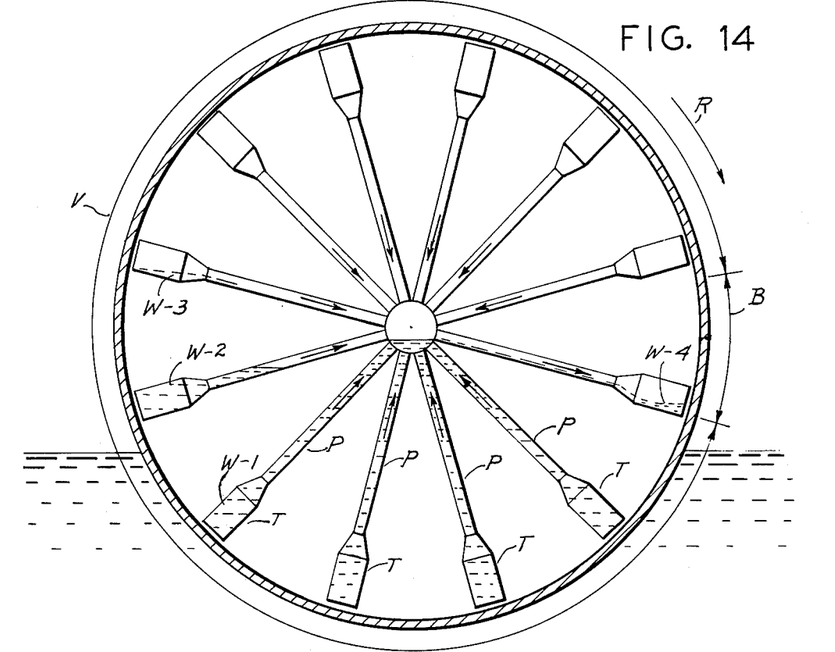
FIG. 14 is a diagrammatized cross-sectional view of the filter drum, illustrating the operation of the blowback interceptor means.

FIG. 14 more particularly illustrates the operation of the liquid-intercepting externally closed trap in the course of the filter operating cycle. With the drum rotation clockwise in the direction of arrow "R" and the drum immersed in the pulp to level "L," vacuum suction is kept effective throughout the major portion "V" of the periphery of the drum including the various suction phases previously described, while blow-back is effective only in the small portion or balance "B" of the periphery in the zone of cake discharge.

Figure 18:
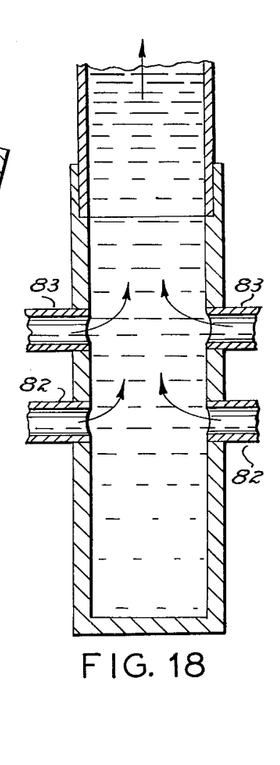
FIG. 18 shows the filtrate trap during the cake formation phase.

It will then be seen in FIG. 14 that the submerged traps "T" as well as their respective filtrate pipes "P" may be full of filtrate liquid W-1 substantially up to the level of the trunnion valve. This condition prevailing during the submergence of the filter panels in the cake formation phase, is illustrated in the detail FIG. 18 having a submerged trap in the upright or 6 o'clock position.

Figure 15:
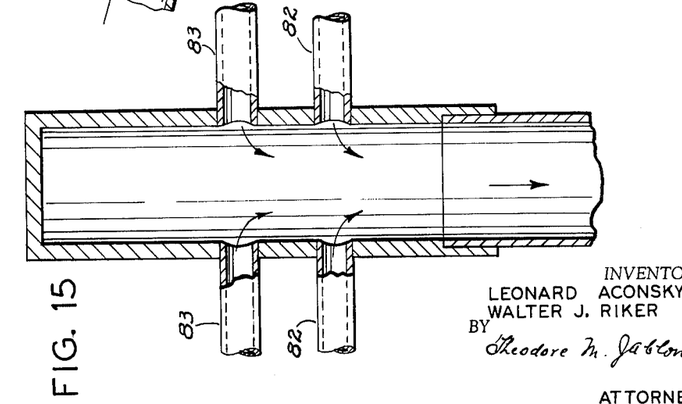
FIG. 15 is a greatly enlarged fragmentary view of the trap inverted and empty.
Figure 16:
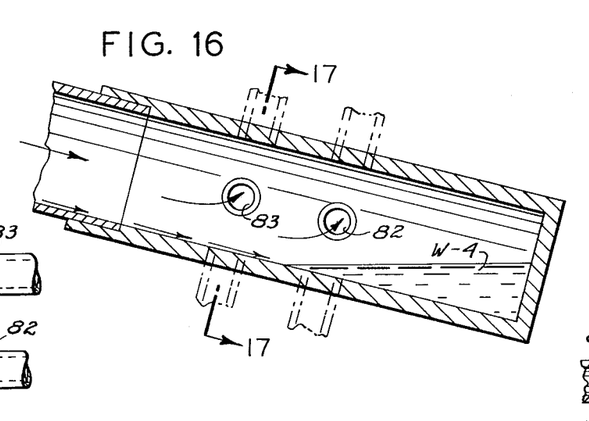
FIG. 16 shows the trap intercepting the residual filtrate liquid.
Figure 17:
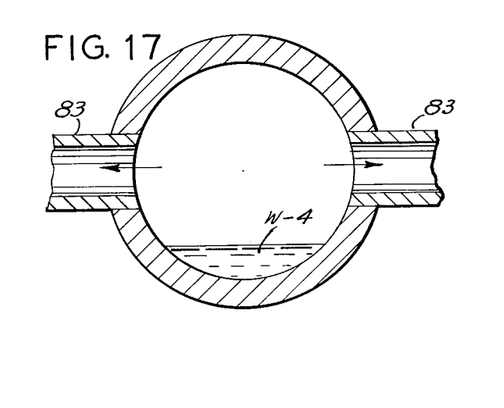
FIG. 17 is a cross section of the trap taken on line 17—17 in FIG. 16.

After emergence of the respective filter panel and of the cake, the trap reaches an inclined position at the ascending side of the drum with a substantial amount of water W-2 still contained in the trap, but with the associated filtrate piping no longer full of liquid alone. In a subsequent, past 9 o'clock position the trap is now sufficiently inclined to allow residual liquid W-3 in the trap to drain off towards the trunnion valve. In the then following inverted positions the trap is empty, while only a mixture of liquid and air is drawn from the filter panels to the trunnion valve, this being further illustrated by the inverted or 12 o'clock position of the trap in FIG. 15. This condition persists until the trap reaches the blow-back phase at the descending side of the drum where residual water from the trunnion pipe is driven back towards the filter panels, but is intercepted as blow-back water W-4 by the now downwardly inclined trap, while the air separates into pipes 82 and 83. This condition is further illustrated in the enlarged detail FIGS. 16 and 17.

From the foregoing description, it will be seen that the invention provides a simple and effective means for preventing residual filtrate from remoistening the filter cake, thereby increasing the filtration efficiency of the machine.

This filtrate trap is preferably combined with the novel arrangement of parallel branch flow connections starting from the central radial pipe or trunnion pipe, the combination providing improved hydraulic flow characteristics, as well as increasing the filtering capacity of the filter unit. In addition, the invention embodied in a composite or modular assembly provides advantages and reduced construction cost.

It will furthermore be understood that each of the elements described above, or two or more together, may also find useful applications in other types of continuous filter units differing from the types described above.

While the invention has been illustrated and described as embodied in the candelabra-shaped pipe construction and with a centrally disposed trap, it is not intended to be limited to the details shown, since various modifications and structural changes may be made, and some parts be used without others in the combination, without departing from the spirit of the invention.

Furthermore, whereas the features of the invention are preferably applied in conjunction with a filtration cycle involving the valve controlled wash and drying zone, these features may also be embodied in various modifications of the filtration cycle. One such alternative is where the wash for the cake need not or should not be applied, for instance where only the recovery of a filter cake of maximum dryness is desired as from an aqueous pulp, for instance a coal suspension or the like. In another alternative the cake drying phase is largely omitted in favor of the washing phase.

Also, the invention may apply to rotary drum filters provided with internal filtrate piping, yet irrespective of whether they be operated by vacuum, or by the application of external pressure as in enclosed filter units, or by external pressure and internal vacuum combined and acting simultaneously.

Also included among the possible embodiments of the invention is the belt type filter wherein the filter medium is in the form of an endless travelling belt engaging a major peripheral portion of the drum and cooperating with external filter compartments, internal filtrate piping, and the trunnion valve.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are to be intended to be comprehended within the meaning and range of equivalence of the following claims.

We claim:

1. In a rotary vacuum drum filter having a trunnion valve, the combination which comprises a cylindrical shell supported by trunnions for rotation about a horizontal axis; external filtrate compartments co-extensive with said axis and arranged side by side about the periphery of said shell and having drainage opening in said shell, and adapted by said rotation to move through a bath of pulp in a filter operating cycle controlled by said trunnion valve, which cycle comprises sequentially a vacuum cake formation phase defined by the submergence of said compartments in the pulp, a subsequent vacuum filtration phase for removing liquid from the cake after emergence from said bath of pulp, and a flow-back cake removal phase at the descending side of the drum, followed by resubmergence of the respective compartments in said pulp; a filtrate pipe construction for each compartment comprising a main conduit having an axially extending portion operatively connected to said trunnion valve at one end, the other end portion of said main conduit extending radially outwardly and formed with an externally closed collecting pocket at the terminal end, a plurality of lateral branch pipes each having one end thereof connected to said radial conduit portion at a point spaced radially inwardly a substantial distance from the end of said closed collecting pocket, and the other end connected to a respective drainage opening in said shell to communicate with said compartment, a respective externally closed collecting pocket constructed and arranged to receive liquid residual in said main conduit substantially during the cake removal phase, and to hold the thus intercepted liquid during the subsequent cake formation phase until after emergence of the cake from said bath, and thereafter to allow the trapped liquid to drain back from said externally closed pocket into said main conduit during said liquid removal phase.

2. The combination according to claim 1, wherein said branch pipes extend in candelabra-shaped arrangement from said radial conduit portion.

3. In a rotary drum filter having a cylindrical shell supported by trunnions for rotation about a horizontal axis, a trunnion valve, and external filtrate compartments co-extensive with said axis and arranged side by side about the periphery of said shell and having drainage openings in the shell, a candelabra-shaped filtrate pipe construction comprising a radially extending main conduit portion, a lateral branch pipe having one end connected to a first point of said radial conduit portion, at least another branch pipe substantially co-extensive with said first branch pipe substantially in a plane with said radial main conduit portion, and having one end connected to a second point of said main conduit portion and spaced radially inwardly from said first point, additional branch pipes substantially corresponding to said first mentioned branch pipes but extending from said radial conduit portion in substantially the opposite direction substantially in said plane, means for connecting the aforementioned branch pipes to respective drainage openings in said shell, a trunnion pipe extending from said trunnion valve to the inner end of said radial main conduit portion, radial means for connecting said main conduit portion to said trunnion pipe and a radially extending externally closed pocket provided at the outer end of said radial main conduit portion and communicating therewith.

4. The filtrate pipe construction according to claim 3, wherein the first mentioned branch pipes have tangential junctures with the main conduit portion in one direction, and the additional branch pipes have junctures with said main conduit portion in the opposite direction.

References Cited by the Examiner
UNITED STATES PATENTS 2,321,230   6/1943   Mills et al. _______ 210—404 X
2,548,999   4/1951   Oliver _____________ 210—404

REUBEN FRIEDMAN, *Primary Examiner.*

S. ZAHARNA, *Assistant Examiner.*